Feb. 8, 1955     E. K. THOMPSON     2,701,664
FARM SEEDER
Filed March 24, 1952     2 Sheets-Sheet 1
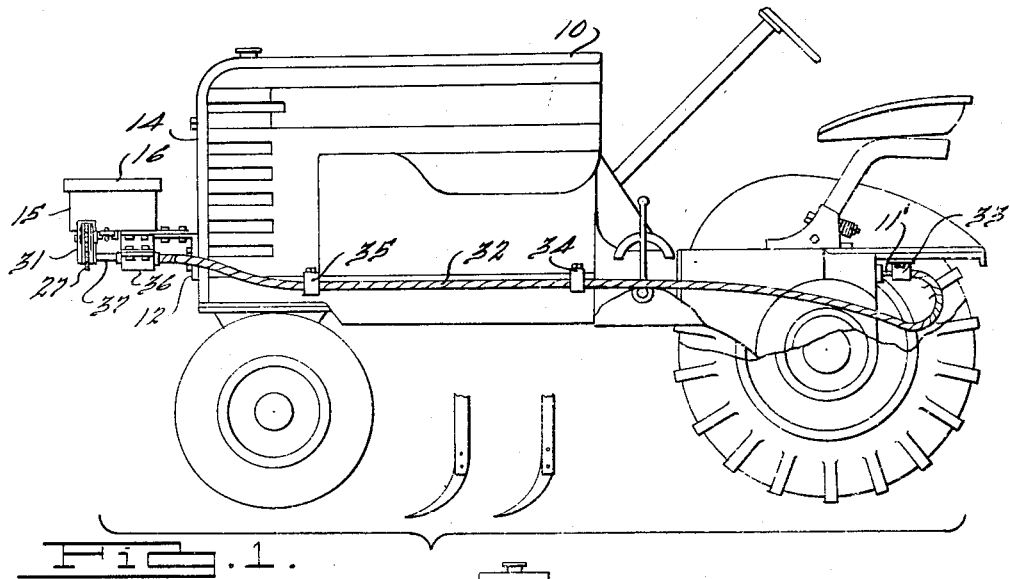
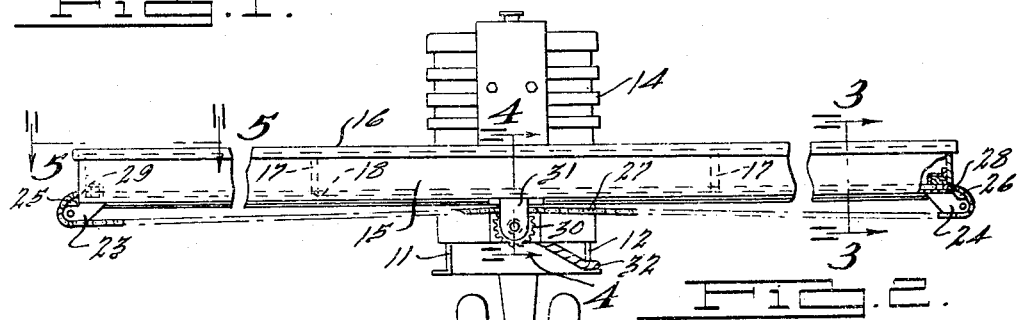
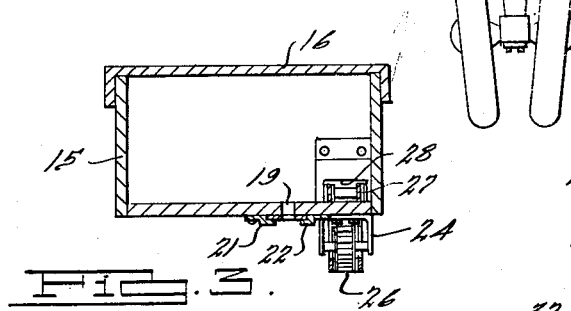
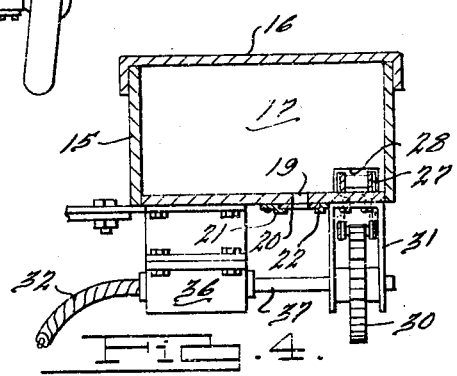
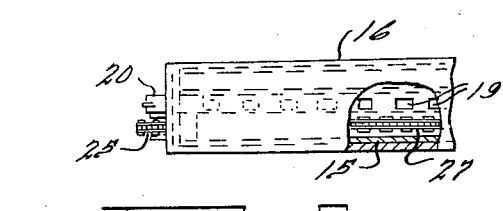
INVENTOR.
Eugene K. Thompson
BY
ATTORNEY.

Feb. 8, 1955     E. K. THOMPSON     2,701,664
FARM SEEDER
Filed March 24, 1952     2 Sheets-Sheet 2
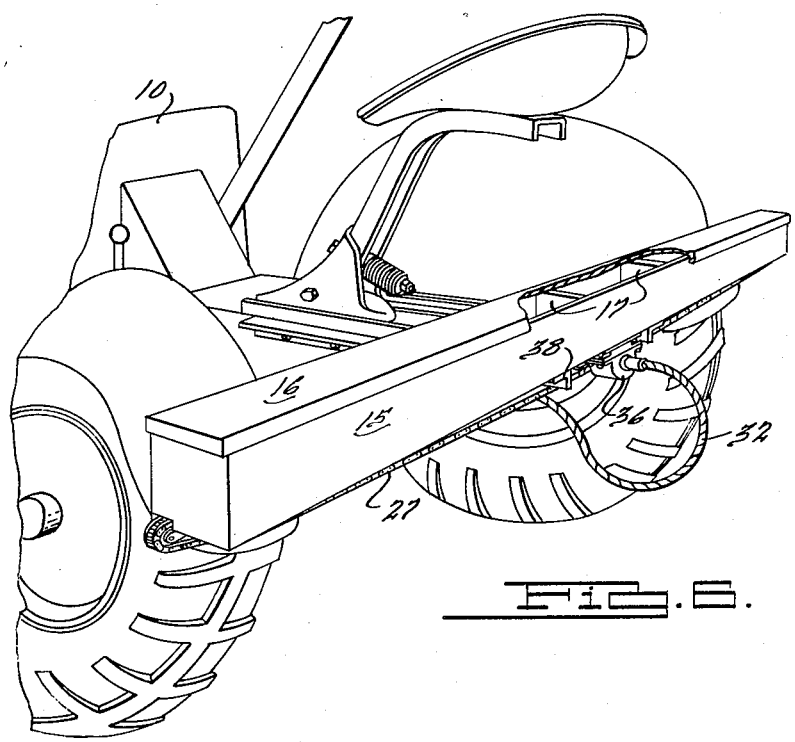
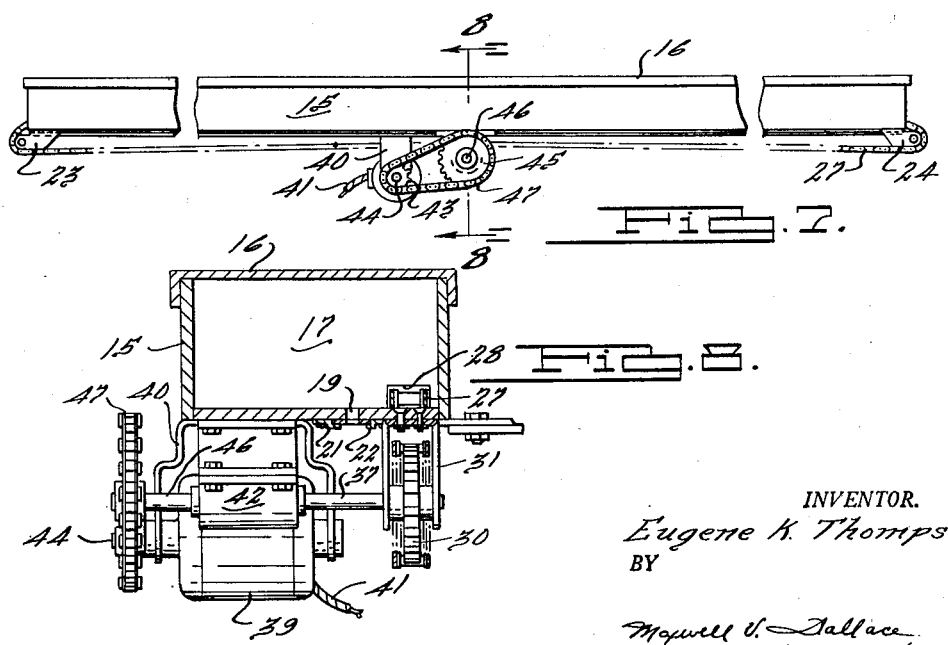
INVENTOR.
*Eugene K. Thompson*
BY
*Maxwell V. Wallace*
ATTORNEY.

United States Patent Office 2,701,664
Patented Feb. 8, 1955

2,701,664

FARM SEEDER

Eugene K. Thompson, Tecumseh, Mich.

Application March 24, 1952, Serial No. 278,207

4 Claims. (Cl. 222—176)

This invention relates to seeders and more particularly to a new and improved seeder attachment for tractors whereby there is provided a durable light-weight seeder attachment that can be readily mounted on the front or rear of the tractor and to also provide a simple and efficient quick attachable and detachable driving connection between the power takeoff of the tractor and the seeding mechanism.

The principal object of the present invention is to provide a new and improved seeder for distributing various type of grass seed, clover, or the like, wheat, barley, oats, etc., when the seeder is secured to the front of the tractor forward of a cultivator secured beneath the tractor.

Another object of the invention is to provide a seeder that may be quickly secured to cultivator gangs at rear of the tractor for distributing grass seed, or the like, in corn fields.

A still further object of the invention is to provide a new and improved seeding hopper adapted to receive an endless chain which in turn causes the seed within the hopper to pass therethrough evenly at all times, providing even distribution over the soil at all times.

The above and other objects will appear more clearly from the following more detailed description, and from the drawings, wherein:

Fig. 1 is a side elevation showing a tractor with the device mounted on the front thereof, and also showing the position of the cultivator tines between the front and rear wheels of the tractor.

Fig. 2 is a front elevational view showing the hopper mounted in front of the tractor radiator, the hopper being broken away to show the endless chain therein.

Fig. 3 is a section taken substantially on line 3—3 of Fig. 2.

Fig. 4 is a section taken substantially on line 4—4 of Fig. 2.

Fig. 5 is a top sectional view of the hopper broken away to show the chain and the aligned openings in the bottom of the hopper.

Fig. 6 is a perspective view showing the hopper mounted on the top of the back cultivator gangs.

Fig. 7 is a view of the hopper showing the type of electric drive used; and

Fig. 8 is a section taken substantially on line 8—8 of Fig. 7 showing the electric motor mounting and drive.

Referring now to the drawings, the numeral 10 designates a standard make of farm tractor which is usually equipped with a power take-off 11'. Most farm tractors are equipped with a pair of opposed studs 11, 12, the same being bolted to the tractor radiator 14. If studs are not provided by the tractor manufacturer, suitable mounting means may be bolted to the sides of the tractor frame. The mounting studs 11, 12 are adapted to receive and hold in place a hopper 15 which is pressed out of heavy galvanized iron to form a rectangular container, the same having a removable lid 16, which may be hinged, if desired, to allow the same to be opened to load with seed and to keep the seed from spilling or becoming moist. To make the hopper rigid and to also keep the seed within same from shifting, there are provided a number of partitions 17, the same extending to the bottom of the hopper and having a small opening 18 in each partition to allow the passage of a chain therethrough, later to be described. The bottom of hopper 15 has a plurality of openings therein 19, the same being in longitudinal alignment, Fig. 5. A stop slide 20 is provided, the same being slidably supported within a pair of opposed guideways 21, 22, said stop slide being constructed of metal and having therein a plurality of openings corresponding in size to openings 19, so that the slide may be moved so that the openings in the bottom of the hopper may correspond with the openings in the stop slide, when desired, or the stop slide may be moved so that the openings in the hopper bottom and stop slide are not in alignment, when it is desired to close openings 19 to stop the flow of seed.

Secured to each end of hopper 15 are U-shaped brackets 23, 24, said brackets being secured to the bottom of hopper 15 and being formed to rotatably support sprocket guides 25, 26 beyond the ends of said hopper. At each end of the hopper 15 there is provided an opening 28, 29 to allow a chain 27 to pass freely into and through hopper 15 and over guide sprockets 25, 26. As shown best in Figs. 2 and 7, the chain 27 is of the endless type, the same passing through the inside of hopper 15 and also beneath the bottom of the hopper.

To drive chain 27, there is provided a sprocket wheel 30, the same being rotatably mounted in U-shaped bracket 31, Fig. 4, said bracket 31 being secured to the bottom of hopper 15 midway between the ends thereof, Fig. 2, and so located that sprocket wheel 30 is at all times in mesh with chain 27. To rotate sprocket wheel 30, a flexible drive shaft 32 is provided, one end of said flexible shaft being secured to power take off 11, and locked by a set screw, said flexible shaft passing through support 33 and run along one side of the tractor 10, passing through supports 34, 35 to bearing 36, said bearing being secured to the under-side of hopper 15, Fig. 4. A sprocket shaft 37 connects bearing 36 and sprocket wheel 30.

As shown in Fig. 6, the hopper 15 may be mounted at the rear of tractor 10, the same being supported by means of the back cultivator gangs 38 and flexible tube drive 32 is secured to power take-off 11', as shown, the tube being shortened to connect with the same type mechanism as shown in Fig. 4.

In Figs. 7 and 8 of the drawings, there is disclosed an alternate form of driving mechanism for endless chain 27, for use where the tractor does not have a power take-off. To overcome this lack of power, there is provided an electric motor 39, the same being supported by means of a U-shaped bracket 40 which in turn is secured to the bottom of hopper 15. A lead line 41 leads to a source of power, such as storage battery, not shown. Sprocket wheel 30 is rotatably supported by means of U-shaped bracket 31, and sprocket shaft 37 connects wheel 30 with bearing 42. A sprocket wheel 43 is secured to armature shaft 44 of motor 39, and a sprocket wheel 45 is secured to shaft 46 which leads to bearing 42. A chain 47 is trained about sprocket wheels 43, 45 to rotate same when power is applied.

The manner in which the device operates is as follows:

The seeder per se is a complete unit and may be carried on the tractor parallel with the side thereof so that the tractor may pass through any size farm gate, until the user reaches the ground he wishes to seed. The hopper may be filled at the barn and extra seed carried on the tractor. When the user is ready to seed grass, clover, grain, oats, barley, or the like, the hopper unit is attached by means of bolts, to the front studs 11, 12, usually found protruding from the front end of most tractors. Flexible tube drive 32, which leads from bearing 36, is then run through supports 35, 34 and 33, and attached to power take-off 11, and locked thereon by a single set screw. Stop slide 20 is then moved so that openings 19 in the bottom of hopper 15, and the corresponding openings in stop slide 20 are in alignment to allow seed from the hopper to pass out of same. When the tractor is put into operation the power take-off shaft is rotated and this power is imparted through flexible shaft 32 to bearing 36 and to sprocket shaft 37 and sprocket wheel 30. Sprocket wheel 30 is in mesh with endless chain 27 and thereby drives said chain. The run of chain 27 is over sprocket wheel 30 and beneath the bottom of hopper 15, over sprocket wheel 25, through opening 29 into hopper 15, through openings 18 in partitions 17 and out through opening 28 in hopper and over sprocket wheel 26, said chain running parallel to openings 19 in the bottom of hopper 15. As chain 27 passes through its run the seed in hopper 15 is shaken out through openings 19 and evenly distributed upon the ground over which the tractor is passing, the seed mixture remaining the same as when it was loaded into the hopper, there being no separating of light seed from heavy seed, and the seed is not blown around as it is with a whirlwind type seeder that forces the seed outwardly from one point in the center of an area. With the hopper mounted in front of the tractor, the operator can see the seeder operate and know how he is sowing seed, and at the same time handle the tractor right to be sure he has no skips in his seeding. Even though seed has been heavily inoculated, the seeder sows evenly and does not clog. In actual operation I have found that if the tractor is operated in third gear, slow-downs or increased speeds do not have any effect upon the quality of the seeding done, the hopper can be set to sow from one pound to seventy pounds of seed per acre.

The partitions 17 extend to the bottom of the hopper and tend to keep the seed from shifting and bunching as the chain moves through the seed.

In Fig. 1 of the drawing there is shown the position in which a cultivator is attached to the tractor when seeding, two of the front teeth of the cultivator only being shown. I have found in sowing grain, or the like with this type of seeder, that by using the front mounted seeder, the grain can be cultivated in to a depth of three inches and still come up in good shape.

The hopper used for the front mounting may also be used for mounting at the rear of the tractor, as shown in Fig. 6, the same being mounted on the standard cultivator gangs found on tractors. When using this rear mounting, a shorter flexible drive is needed, but the seeder works in the identical fashion as when mounted in front of the tractor, simply fasten the hopper to the cultivator gangs and couple the flexible shaft coupling to the power take-off, tighten one set screw and the seeder is mounted ready to operate.

This type mounting of the seeder is for the purpose principally of seeding cornfields the last time the farmer cultivates his corn. As the tractor moves forward the cornstalks are bent forward by the tractor and the hopper and the seed is allowed to drop to the ground. This is vastly different from the whirlwind type seeder which throws seed all over the corn and deposits a large amount of seed in the leaves and this seed does not get to the ground. The hopper distributes the seed over the soil just the width of the cultivator, so that the light drag teeth, which are used in place of the back cultivator teeth, can cover practically all seed. This seeding of cornfield ties the soil down, keeps it from washing way during the winter and spring months—gives it a good green crop to plow under to build up the humus and draw nitrogen into the soil.

The alternate form of the invention disclosed in Figs. 7 and 8 of the drawings may be mounted on either the front or the back of a tractor of the type not having a power take-off, the endless chain being moved by electric power furnished by a dry cell. When electric motor 39 is energized, sprocket wheel 43 on the armature shaft of said motor is rotated. A sprocket wheel 45 is mounted upon shaft 46 which in turn is connected to bearing 42, and shaft 37 connects bearing 42 with sprocket wheel 30, which meshes with and drives endless chain 27. A chain run 47 connects sprocket wheels 43, 45 and when wheel 43 is rotated, chain 47 rotates wheel 45, and this rotation is imparted to shaft 37 and hence sprocket wheel 30 to move chain 27 at the desired speed for proper seeding. The entire power mechanism is secured to the bottom of hopper 15 and remains a complete unit ready to be quickly attached or detached to a tractor.

There is disclosed herein a new and unique seeding mechanism, self contained and easy to mount on a tractor either front or rear. The moving endless chain causes seed to pass out through the seeder hopper at an even speed of distribution and to sow the same evenly throughout the land being seeded, eliminates thin strips of seeding, and the operating of the seeder from the power take-off of the tractor is practically the same as measuring the acres being seeded with a tape, when the tractor is kept in third gear. The spaced barriers within the seeding hopper prevent seed from shifting and bunching and allows it to pass down through the openings in the bottom of the hopper at an even flow. If the operator wishes to stop seeding at any time, he need only move the stop slide in the bottom of the hopper so that the openings in same are not in alignment with the openings in the bottom of the hopper, and seed will not flow.

While I have described and illustrated a satisfactory device that has proven highly successful in practical operation, it will be understood that the invention is not limited to specific constructional details shown and described, but that many changes, variations and modifications may be resorted to without departing from the principles of my invention.

I claim:

1. A farm seeder for use in combination with a tractor having front supports and a power take-off, comprising an elongated feed hopper mounted upon said front supports, said hopper having longitudinally aligned material discharge openings at spaced points in the bottom thereof, slide means slidably supported by said hopper bottom to allow seed to pass through said discharge openings or to prevent the passage of seed out of said hopper, aligned openings in opposite ends of said hopper offset laterally from the material discharge openings in the bottom of the hopper, a bracket adapted to rotatably support a sprocket wheel secured to said hopper near each of said openings, a plurality of spaced-apart transverse partitions in said hopper each having an opening therein, an endless chain threaded through said partition openings and said end openings in said hopper and running parallel with but offset laterally from said material discharge openings in said hopper and over said end sprocket wheels and back under the bottom of said hopper, a bearing member secured to the bottom of said hopper, a bracket secured to the bottom of said hopper adapted to rotatably support a sprocket wheel, said sprocket wheel being in mesh with said endless chain at all times, and a flexible driving tube having one end thereof connected to said bearing and the other end of same connected to said power take-off to impart power from said take-off to said bearing and sprocket gear to drive said endless chain and in turn evenly distribute seed from said hopper.

2. A farm seeder for use in combination with a tractor having supports at the rear of the tractor driving wheels, comprising an elongated feed hopper mounted upon said rear supports, said hopper having longitudinally aligned material discharge openings at spaced points in the bottom thereof, slide means slidably supported by said hopper bottom to allow seed to pass through said discharge openings or to prevent the passage of seed out of said hopper, aligned openings in opposite ends of said hopper laterally offset from the material discharge openings in the bottom of the hopper, a bracket adapted to rotatably support a sprocket wheel secured to said hopper near each of said openings, a plurality of spaced-apart transverse partitions in said hopper having openings therein aligned with said end openings, an endless chain threaded through said partition openings and said end openings in said hopper running parallel with but laterally offset from said material discharge openings in said hopper and over said end sprocket wheels and back under the complete bottom of said hopper, a bearing member secured to the bottom of said hopper, a bracket secured to the bottom of said hopper adapted to rotatably support a sprocket wheel, said sprocket wheel being in mesh with said endless chain at all times, and a flexible driving tube having one end thereof connected to said bearing and the other end of same connected to said power take-off to impart power from said take-off to said bearing and sprocket gear to drive said endless chain and in turn shake seed evenly from said hopper.

3. An ambulant farm seeder for use with a tractor or the like comprising an elongated feed hopper carried by said tractor, said hopper having longitudinally aligned material discharge openings at spaced points in the bottom thereof, aligned openings in the ends of said hopper offset laterally from the material discharge openings in the bottom of the hopper, a bracket adapted to rotatably support a sprocket wheel secured to said hopper near each of said openings, and means for loosening the material within the hopper and causing it to flow evenly through the bottom material discharge openings comprising an endless chain threaded through said end openings in said hopper and running parallel with but laterally offset from said material discharge openings in said hopper bottom and over said end sprocket wheels and back under the bottom of said hopper, and actuating means carried by the tractor for driving said endless chain.

4. An ambulant farm seeder for use with a tractor or the like comprising an elongated feed hopper carried by said tractor, said hopper having longitudinally spaced material discharge openings in the bottom thereof, aligned openings in the ends of said hopper offset laterally from the material discharge openings in the bottom of the hopper, a bracket adapted to rotatably support a sprocket wheel secured to said hopper near each of said openings, and means for loosening the material within the hopper and causing it to flow evenly through the bottom material discharge openings comprising an endless chain threaded through said end openings in said hopper and running parallel with but laterally offset from said material discharge openings in said hopper bottom and over said end sprocket wheels and back under the botom of said hopper, and actuating means carried by the tractor for driving said endless chain.

References Cited in the file of this patent

UNITED STATES PATENTS

| | | |
|---|---|---|
| 1,099,774 | Smith | June 9, 1914 |
| 2,575,985 | Thompson | Nov. 20, 1951 |
| 2,623,751 | Kaller | Dec. 30, 1952 |
| 2,630,945 | Gandrud | Mar. 10, 1953 |